United States Patent
Forsman et al.

(10) Patent No.: US 6,393,729 B1
(45) Date of Patent: May 28, 2002

(54) METHOD, CONTROL PARADIGM AND MEANS FOR MONITORING AND CONTROLLING THE PROCESS VARIABLES OF A PROCESS GAS FLOWING THROUGH A DRYER HOOD USED IN A DRYING PROCESS

(75) Inventors: Krister Forsman, Lund; Roger Sigvant, Växjö, both of (SE)

(73) Assignee: ABB AB, Västerås (SE)

( * ) Notice: Subject to any disclaimer, the term of this patent is extended or adjusted under 35 U.S.C. 154(b) by 40 days.

(21) Appl. No.: 09/509,797

(22) PCT Filed: Oct. 2, 1998

(86) PCT No.: PCT/SE98/01781

§ 371 (c)(1),
(2), (4) Date: Jun. 23, 2000

(87) PCT Pub. No.: WO99/18405

PCT Pub. Date: Apr. 15, 1999

(30) Foreign Application Priority Data

Oct. 3, 1997 (SE) ................................................ 9703611

(51) Int. Cl.$^7$ .............................. F26B 3/00; F26B 21/00
(52) U.S. Cl. .............................. 34/445; 34/446; 34/524
(58) Field of Search ........................... 34/524, 528, 445, 34/446, 486, 491

(56) References Cited

U.S. PATENT DOCUMENTS

| 4,139,953 A | * | 2/1979 | Gaskell .................. 34/23 |
| 4,569,658 A | | 2/1986 | Wiggins et al. |
| 4,580,354 A | * | 4/1986 | Lindberg .................. 34/26 |
| 4,862,599 A | * | 9/1989 | Brunner .................. 34/46 |
| 4,893,415 A | * | 1/1990 | Moldrup .................. 34/16.5 |
| 5,105,555 A | * | 4/1992 | Nakagomi .................. 34/1 |
| 5,174,745 A | | 12/1992 | Kim |
| 5,303,484 A | * | 4/1994 | Hagen et al. .................. 34/155 |

FOREIGN PATENT DOCUMENTS

| DE | 3630561 | 3/1987 |
| EP | 0648420 | 4/1995 |
| JP | 8261646 | 10/1996 |

* cited by examiner

Primary Examiner—Ira S. Lazarus
Assistant Examiner—K. B Rinehart
(74) Attorney, Agent, or Firm—Dykema Gossett PLLC (57) ABSTRACT

A method and device for controlling a process gas (10) during drying of a product in a drying chamber, in which the process gas is brought into contact with the product so that a substance, for instance water, is taken up by the process gas and transported out from the drying chamber and makes use of a control paradigm for controlling process variables of the process gas (10). In the process, and by the device, a first group of process variables including the process gas content (x) of the substance removed from the product and the pressure conditions (z) inside the dryer hood are monitored and controlled. Based on a change of one of the controlled process variables (x;z), one or more process variables forming part of a second group of process variables, including process gas supply flow (a) and output flow (e), are controlled, thus controlling the process, and the process gas content (x) of the substance removed from the product, and the pressure conditions (z) inside the drying chamber, are controlled independent of each other, and the process gas supply flow (a) is compensated for a change of the process gas output flow (c).

18 Claims, 2 Drawing Sheets

METHOD, CONTROL PARADIGM AND MEANS FOR MONITORING AND CONTROLLING THE PROCESS VARIABLES OF A PROCESS GAS FLOWING THROUGH A DRYER HOOD USED IN A DRYING PROCESS

TECHNICAL FIELD

The present invention relates to a method, control paradigm and means for controlling and monitoring, during a drying process, process variables of a process gas flowing through a drying chamber used for the drying. Process gas flows continuously through the drying chamber. The conditions in the drying chamber are manipulated by monitoring and controlling a number of different process variables of the process gas according to the inventive control paradigm. The inventive device also includes a device for manipulating, in accordance with the inventive control paradigm, the conditions in the drying chamber by controlling and monitoring a number of process variables of the process gas flowing through the chamber.

PRIOR ART

For drying a water containing material, as well as for evaporation of a solvent or a binding agent during lacquering or manufacturing of plastics materials or ceramic green bodies, a variety of different methods are used, in which the material to be dried is heated for evaporation of a substance, such as water or a solvent. In order to achieve an efficient drying, the evaporated substance is in many processes removed from the zone adjacent to the dried material by means of a drying gas, flowing adjacent to said dried material, preferably air. In the following, prior art and the present invention are described from the point of view of drying a material containing moist or water, or a product containing moist or water, but the technique is of course useful also for other drying processes, in which an evaporated substance is taken up by a process gas, and transported in said gas, away from the dried product.

In order to control the process gas, and in particular its ability to take up and remove the evaporated substance, a process chamber is used for many processes. For stationary batch processes the chamber is often referred to as a drying oven, or a drying cabinet, and for continuous drying of web material or products it is often called a dryer hood. Other drying processes, primarily designed for treating grain size material use drying chambers in the form of rotating cylinders or fluidized beds, in which the grain size material meets and mixes with the drying gas.

Drying cabinets are used for wet water containing pulp material, such as pulp for manufacturing paper or boards, pulp for the mineral, ceramic, metallurgical and chemical industry, for drying solid products such as natural materials, e.g. chips, wood or dewatered products in for instance the ceramic industry, and for wood fibre based boards and some mineral and/or mineral fibre based construction and insulation products, in particular formed products, such as sheet rock, rock wool, glass wool and construction and insulation boards adapted to replace asbestos materials, and also for evaporation of solvents during lacquering, et c. The heat which is necessary for the drying process may be supplied to the material to be dried in any desired way, for instance by means of radiation from infra-red heaters, micro-waves or high-frequency radiation, thereby generating heat in the material to be dried, although it is preferred to use the heat content of the drying gas used. The result of the drying is however highly dependent on the efficiency and the uniformity of the evaporation of the water/solvent which is taken up by the drying gas and removed from the drying cabinet.

Drying cabinets and similar drying chambers are used in continuous web processes for paper, carton, sheet rock, rock wool boards et c. For these processes it is also possible to use a variety of different methods in order to achieve the desired evaporation of water and/or solvent, preferably by supplying/generating heat according to any of the above mentioned methods. Also in this regard, the ability of the drying gas to take up and remove the substance evaporated from the product is important for the result of the drying process. For web drying, for instance, it has since long been common to use dryer hoods. Said hoods are, for drying thin web material such as paper moving with high speed, arranged in combination with drying cylinders adjacent to the web. The paper moves with high speed along a path through the dryer hood, and the result of the drying is mainly influenced by the vapour pressure inside the cylinders, but it is also influenced by the process variables inside the dryer hood, and mainly, then, by the process variables of the process air flowing through the dryer hood.

For paper drying, as well as for a variety of other drying processes, there are, apart from requirements on the efficiency of the drying process, a number of additional boundary conditions, such as a uniform drying of the entire surface of the product, which means that the product, after drying, has a uniform and reduced moisture content over its entire length and width;

good heating economics;

small leakage of moisture and heat to the surrounding environment;

low noise level;

high accessibility; and easy access for maintenance, adjustments and repair.

In order to achieve the desired process conditions in a drying chamber, one or more process variables of the process air which flows through the drying chamber are monitored and controlled. A commonly monitored process variable is the water content of the process air, and usually it is the water content of the exhaust air of the drying chamber. Moreover, the water content of the exhaust air influences the process heating economics, and thus the overall process economics. The same goes for a drying process in which a solvent or the like is volatilised.

Another process variable which is significant for the drying process is the internal pressure or the pressure conditions in the drying chamber, which are usually expressed as the zero level of the drying chamber (mm), i.e. that level, at which the pressure difference $\Delta P = P_{surr} - P_{hood}$, between the pressure in the drying chamber and the surrounding pressure is zero. Normally said process variables are monitored by means of sensing and other means for measurement, arranged adjacent to the drying chamber. The measuring means are arranged in control loops which additionally, according to prior art comprise a conventional controller and actuators. The actuators influence a manipulated process variable which is known to influence the monitored process variable which is being measured. Examples of manipulated process variables used for controlling the process air and thereby influencing the drying conditions in a drying chamber are supply air flow and exhaust air flow ($m^3$/min). The supply air flow and the exhaust air flow are controlled by means of an actuator, such as a damper or, as an alternative, a speed control for a variable speed fan. Known and conventional methods for process air control use control loops comprising one controlled and monitored process variable, associated with only one manipulated process variable, and controlled by said variable. In this type of process control, the fact that a change of a manipulated process variable can influence several monitored process variables is neglected, as is the fact that a monitored process variable may be dependent on changes of a plurality of manipulated process variables. Accordingly, this necessitates meticulous and extensive tuning methods for controlling the process air during tuning of a new drying equipment. It is further rather complicated to compensate the process air for changes in other process variables in the drying process, or for changes in other conditions for the drying process, for example changes in the previous process. Further, the process air is in some cases very sensitive to disturbances. What is stated above is also valid for process gases other than air.

It is known, within the field of process control, e.g. from other processes than the drying process in paper making, to use a control loop based on a control paradigm which apart from sensing means, a controller and actuators comprises a dynamic model of the controlled process, and in some cases also a correction unit which describes and compensates for the influence of the control loop, said controller co-operating with the process model and the correction unit if present, for controlling the process in question. Thus, known relationships between the manipulated and the monitored process variables are taken into consideration for controlling the manipulated process variable, as well as the influence of additional process variables. Such a process control, based on a control paradigm comprising a model of the controlled process is often called IMC, short for "Internal Model Control". Even when using IMC for process variable control in a drying process, the need for a rather extensive tuning remains. The sensitivity to disturbances remains, since the pressure conditions inside the chamber, the zero level, is influenced by both the supply air flow and the exhaust air flow.

The principal object of the present invention is to provide a method for controlling a process gas which in a drying process flows through a drying chamber used in the drying process, in order to achieve an improved control of the moisture profile of the material or the product and improved heating economics, by means of an improved, stable and reliable control of the process variables of the process gas, in a flexible process which is easy to tune, and has low sensitivity to disturbances. As an alternative, the improved, stable and reliable control of the process variables of the process gas results in an improved control of the volatilisation of a solvent, further entailing positive effects on the inner and outer characteristics of the dried material and improved heating economics, in a flexible process which is easy to tune and has low sensitivity to disturbances.

Another object of the present invention is to provide a method for monitoring and controlling, in a drying process, the process gas content of a substance evaporated in the drying process and the pressure conditions in a drying chamber which is used in the drying process, by means of a control paradigm which is easy to implement and tune, and which is also very robust and has low sensitivity to disturbances.

In particular, it is an object of the present invention to provide a method comprising such a control paradigm for monitoring and controlling the water content of the process air and the pressure conditions inside the dryer hood in a paper drying process, in which a drying chamber is arranged adjacent to a paper web, and in which the paper web and process air continuously pass through the drying chamber, during the removal of water from the paper. The control paradigm used in the drying process according to the present invention is adapted to secure the maintaining of the desired moisture profile, preferably a uniform moisture content across the cross section of the paper web, and along the paper web within allowed intervals, while at the same time running the drying process with good or improved heating economics.

Yet another object of the invention is to provide a control paradigm for controlling the inventive process. A further object of the invention is to provide a device for carrying out the inventive process.

BRIEF DESCRIPTION OF THE INVENTION

In order to influence the drying conditions in a drying chamber when drying a product, in the drying chamber, through which a process gas flows, the product being located in, or passing through the drying chamber, the process gas during its passage through the drying chamber being brought into contact with the product so that a substance is taken up by the process gas, the substance being, at least in part, removed from the product and transported out from the drying chamber with the process gas, a number of process variables of the process gas are controlled and monitored by means of a process in which the process variables of the process gas are controlled in such a way that the objects stated above are achieved by means of a method for controlling process variables of the process gas wherein the process variables of the process gas flowing through the drying chamber are controlled and monitored by controlling and monitoring a first group of controlled process variables, including the product's content x of the substance to be removed, and the pressure conditions, z, in the drying chamber, and in which, based on a change in a controlled process variable, x or z, one or more process variables forming part of a second group of manipulated process variables, including process gas supply flow a, and exhaust flow, e, are manipulated so that the content x of the substance to be removed in process gas and the pressure conditions, z, in the drying chamber are controlled independently, and in which the supply flow a is compensated for a change in the exhaust flow, e.

The present invention is in the following exemplified by means of examples from drying processes comprising drying a water containing product, and air containing water or moist, but it may nevertheless be applied on all types of drying processes in which a product is located in, or passes through a drying chamber through which a process gas flows, and in which the process gas is passed adjacent to, or through the product so that a substance is taken up by the process gas, removed from the product and transported out from the drying chamber with the process gas. Such processes include, of course, the removal of water from water containing products in continuous or essentially continuous processes, with products like paper, sheet rock, mineral wool or glass wool boards, ceramics et c, as well as for batch processes for products such as formed pieces of mineral and or paper, food stuff, wood, wood chips et c, but also for drying related to processes such as lacquering, volatilisation of solvents or binding agents from formed pieces or web material. In continuous processes using the present invention, the relative flow of process gas and the product may be parallel flow, counter flow, cross flow or combinations of said flow types.

According to a preferred embodiment, the inventive method is used for controlling process variables in a process gas, which is essentially comprised of air, in a drying process in which the product to be dried contains water, and in which water is evaporated in the drying process, taken up by the process air, and transported out from the drying chamber with the process air, the process air water content x and the drying chamber pressure conditions z are controlled independent of each other, and the supply air flow a is compensated for a change in the exhaust air flow e. It is particularly advantageous to use the method according to the present invention for controlling process variables of a process gas which is mainly consists of air, which passes through a drying chamber arranged adjacent to a product path in which a water containing product, such as paper or mineral based board, passes through the drying chamber in an essentially continuously manner, in which, during the passing of the product and the process air through the drying chamber, these are brought into contact with each other so that water is taken up by the process air, removed from the product and transported out from the drying chamber with the process air, and in which the water content x of the process air, and the pressure conditions z in the drying chamber are controlled independent of each other, and the input air flow a is compensated for a change in the exhaust air flow e.

The process gas content x of the substance to be removed. e.g. the water content of the air, is measured by means of suitable sensing means such as devices for gas analysis, substance sensitive sensing means, dew point sensors et c, and is preferably controlled by means of a first control loop, the measured variable value for x being associated with and controlled by the manipulated process variable process gas exhaust flow e. In the same, way the pressure conditions, z, inside the drier hood are expressed as the zero level, i.e. that level inside the hood at which the pressure inside said hood is equal to the pressure outside the hood. The pressure conditions, or the zero level, z, is controlled by means of a second control loop for hood pressure conditions, said zero level in the dryer hood being associated with, and controlled by the manipulated process variable process gas supply flow, a. Supply and exhaust flow are adjusted by conventional means, such as dampers, or speed controlled fans. When dampers are used, the process variables a and e are often expressed as the relative opening of the damper.

A control paradigm, for monitoring and controlling process variables in a drying process of process air flowing through the drying chamber for control of the drying conditions inside the chamber comprises:

the drying process;

output variables in the form of the controlled process variables process air content x of a removed substance and the hood pressure conditions, z;

input variables in the form of the manipulated process variables process gas supply flow a, and process gas exhaust flow, e;

controllers with associated actuators, arranged to control the process gas in the drying process, based on a change in a controlled process variable, by means of an adjustment of a manipulated process variable, and, according to the present invention;

two mutually independent, decoupled control loops, whereby a first independent control loop is arranged to control the process air water content by means of the supply air flow, a;

a second independent control loop is arranged to control the pressure conditions inside the drier hood by means of the exhaust air flow; and the decoupling of the two control loops is a feedforward decoupling, and provided with means to compensate the supply air flow, a, for a change in the exhaust air flow, e.

According to a further embodiment of the inventive method, the two control loops are both connected to a dynamic model of the process air, dew point, x and zero level z being correlated to a setting of the exhaust flow, e, and the supply air flow a, respectively, by means of suitable actuators, such as dampers or speed controlled fans.

The two control loops are preferably closed, each comprising a correction function which is specific for each loop, which corrects the manipulated process variable for the influence of the control loop dynamics.

According to a preferred embodiment, the two control loops comprise two serially coupled controllers, whereby;

a first controller, on its input side, is connected to the output variable (x; z) and the dynamic process model, and on its output side connected to the input side of a second controller; and a second controller, on its input side, is connected to the output of the first controller, and an external unit for receiving and external point of operation, and on its output side connected to the process and the dynamic process model, via the loop specific correction function.

A device for carrying out the inventive method comprises a dryer hood, actuators for controlling the process gas supply flow into the drying chamber and the product, and actuators for controlling the process gas output flow from the drying chamber and the product, sensing means and other means for measurement for determining the controlled variables process gas content of the substance evaporated from the product, and drying chamber pressure conditions, controllers and a control system, characterised by two independent and decoupled control loops, whereby:

a first control loop is arranged to control the process gas content of the substance evaporated from the product by means of process gas output flow, e;

a second control loop is arranged to control the pressure conditions inside the drying chamber by means of process gas supply flow, a; said loops being arranged mutually independent, and decoupled by means of at least one feedforward filter for compensating the process gas supply flow, a, for a change of the process gas output flow, e. Preferably both loops are closed loops, and each comprise a loop-specific filter for correcting the influence of the control system, on the manipulated process variable of each loop.

According to one embodiment, each one of the loops is connected to an electronic unit with software, in the form of a dynamic model of the process gas.

According to a preferred embodiment of the invention, each of the both control loops comprise two controllers arranged in series, a first controller being provided with a first input for the output variable (x; z), a second input for the dynamic process model, and an output connected to an input of a second controller, and a second controller being provided with a first input connected to the output of the first controller, and a second input connected to an external unit for receiving an external operating point and an output connected to the process and the dynamic process model via the loop-specific correction filter.

According to yet another embodiment, the control system comprises an electronic device with the necessary software, for:

independent control of the process gas content, x, of the substance taken up from the product, and the pressure conditions, z, by means of the process gas output flow, e, and supply flow, a, respectively;

compensating the process gas supply flow, a, for a change in process gas output flow, e;

for the dynamic process model; and for the filter functions.

DRAWINGS

The invention will now be described in closer detail, by means of a preferred embodiment, with reference to the appended drawings.

DETAILED DESCRIPTION OF THE DRAWINGS

For monitoring and controlling a process gas flowing through a drying chamber used for drying a product, and thus influencing the drying conditions in the drying chamber according to the present invention, a control paradigm is used, which monitors and controls the drying process by means of two monitored and two manipulated process variables, and which comprises two control loops, said variables being associated in pairs, such that one monitored and one manipulated process variable is associated with each loop. Apart from the necessary sensing means and actuators, i.e. one sensor for each monitored process variable and actuators for each manipulated process variable, and a controller, each loop preferably comprises a model of the controlled process. Further, both loops are applied together in a decoupled system. The control paradigm comprises the two control loops, arranged together in a decoupled system, each comprising a process model, and, possibly, a compensating transfer function, in the form of a filter for securing that, in controlling the process gas which in a drying process according to the present invention flows through a drying chamber, a change in the setting of a manipulated process variable only influences one of the two monitored process variables, leaving the other process variable essentially uninfluenced. In this way, the two monitored process variables may be monitored and controlled individually, even though one or both of the monitored process variables may be influenced by both of the manipulated process variables.

Figure 1:
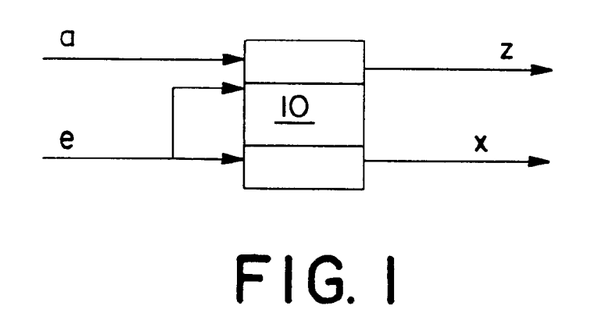
FIG. 1 shows, schematically, a contemplated model of the process and dependency of the controlled process variables on the manipulated process variables.

FIG. 1 shows a simple model of the process gas 10. For the purpose of controlling the process gas 10 flowing through a drying chamber in which a product is being dried, in which drying the gas and the product are brought into contact with each other, and the substance evaporated from the product is taken up by the gas and transported out from the drying chamber with the gas, it has proven necessary to monitor and control the following variables;

the content, x, in the process gas, of the substance evaporated from the product; and the pressure and the pressure conditions, z, inside the dryer hood, which is commonly represented by the zero-level inside the hood, which is the level inside the hood at which the pressure inside the hood is equal to the ambient pressure.

According to the invention said two variables, x, z, are monitored, either by continuous measuring, or by sampling. Then they are correlated to the two manipulated process variables which influence the monitored variables, and are used to control said variables. Said manipulated variables are the incoming flow or supply flow, $Q_a$ of process gas which is supplied to the drying chamber, and the outcoming flow, or output flow, $Q_e$ of process gas leaving the drying chamber, respectively. The manipulated variable supply flow, a, only influences the zero-level z, while the other manipulated process variable output flow, e, influences both the zero-level z and the gas content x of the substance taken up from the product, according to the contemplated process model shown in FIG. 1.

Figure 2:
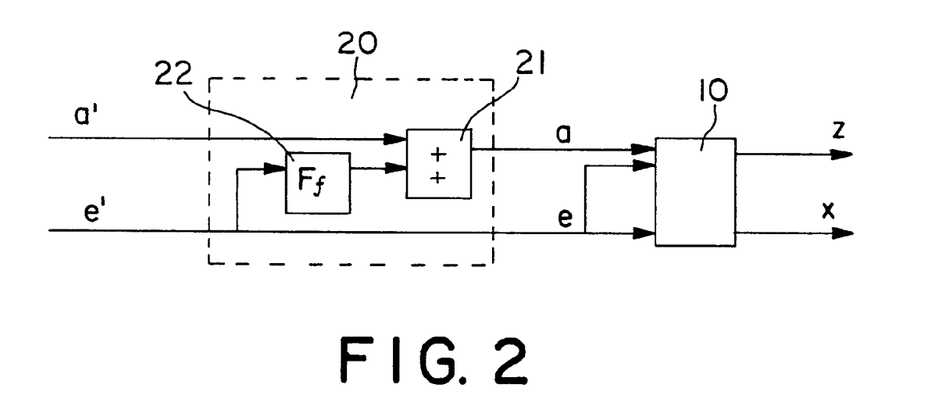
FIG. 2 shows, schematically, the conceptual structure of a compensating unit, comprising a feedforward filter for the process model shown in FIG. 1.

The dynamic changes of the measured variables x and z for changes in the manipulated variables a and e may be estimated by means of a system of linear transfer functions for different sub-processes. Said control variables and their interrelationships vary for different chambers, but they can easily be determined by means of a simple experiment, a so-called bump test. Normally both input and output variables are expressed as deviations from a predetermined point of operation. The total linear model used to sum up the process air 10, and thus describe the relationships between the variables which characterise the process air inside the dryer hood, comprises three transfer functions, $G_{xe}$, $G_{ze}$ and $G_{za}$. As was already mentioned, the gas output flow, e, influences both the process gas content, x, of the substance evaporated from the product, and the pressure conditions, z, inside the drying chamber. In order to facilitate the control of the process variables of the process gas, x and z are, according to the present invention controlled by means of a control paradigm comprising two control loops, arranged together in a decoupled system, i.e. comprising a feed forward compensating unit 20, preferably in the form of a filter 22 and a control unit 21 which is arranged in connection with the loops to allow controlling them individually. The facilitation of the process control which is achieved by this control paradigm ensures that a change in the setting of the manipulated process variable output flow, e, only influences the process variable x, while process variable z is left essentially uninfluenced. In this way the two monitored process variables can be monitored and controlled individually, despite the fact that the gas output flow e influences both z and x. In FIG. 2, a simple structure of feed forward filters for the both separated control loops is shown, comprising a compensation unit 20 having a filter 22, which has a compensating transfer function $F_f$, by means of which the variable a representing the gas supply flow can be compensated for a change in the output flow e, where e' represents an actuator for x, and a' an actuator for z. When the time constant $T_{ze}$ of the control loop from supply flow a to z is equal to the time constant $T_{za}$ of the control loop from output flow e to z, the filter transfer function $F_f$ becomes a constant, and it can normally be assumed that $T_{ze}=-T_{za}$, i.e. that $F_f(s)=1$. By means of intuitive interpretation of the filter transfer function, it is then possible to deduce that z only depends on the difference between output and supply flow.

Figure 3:
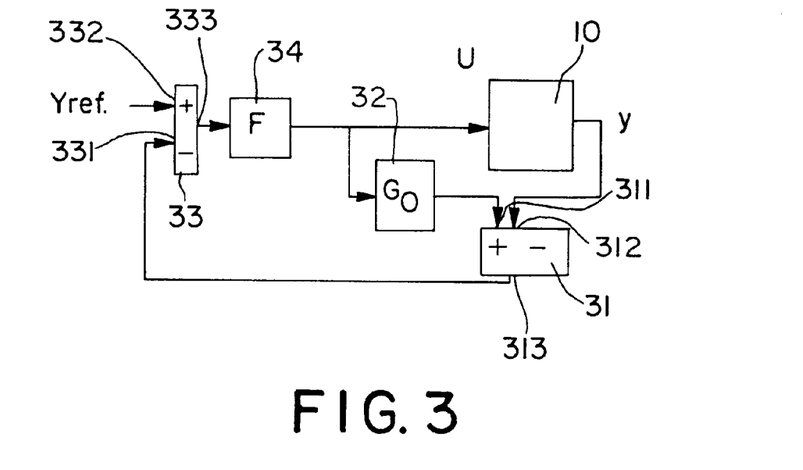
FIG. 3 shows, schematically, a control loop comprising an internal dynamic model of the controlled process, an IMC control loop.

IMC, or Internal Model Control is a well known and tested control paradigm which comprises a model 32 of the controlled process. FIG. 3 shows a basic configuration of a control loop for IMC in the form of a block diagram. The use of this type of process control requires two things:

a model $G_0$ of the controlled process, having algorithms or models that describe the relationships between the variables of the process, both measured and manipulated, usually provided in the form of an electronic unit with the necessary software 32, and a loop specific transfer function F, which describes the closed control loop in the system, and corrects for the influence of the control system, preferably provided in the form of a loop specific filter 34. The embodiment shown in FIG. 3 of a control loop for IMC comprises;

a sensor for measuring a first process variable y;

actuator for manipulating a second process variable u which influences the first process variable y;

a first control unit 31 with a first input connected to the sensor 312 and a second input 311 connected to a process model $G_0$, which describes the process, and an output 313 connected to an input 331 of a second control unit 33, connected in series with the control unit 31;

a second control unit 33 having a first input 331 connected to the output 313 of the first control unit, and a second input for the reception of an external point of operation, and an output 333 connected to the process model 32 and the process 10 via a loop specific filter 34; and a loop specific filter 34 in which the signal from the output 333 of the second control unit is corrected before being delivered to the actuator u and the process model 32.

IMC is described in closer detail for example in the book "Robust Process Control" by M. Morari and E. Zafiriou, published by Prentice Hall, 1989, ISBN 0-13-782153-0.

Figure 4:
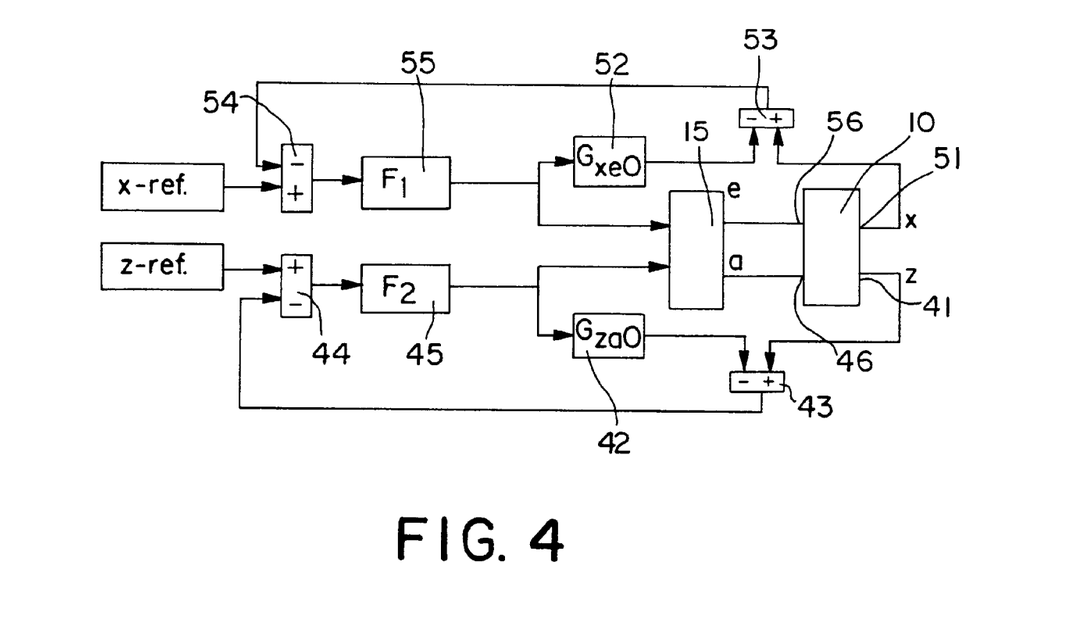
FIG. 4 shows a control system for the process in accordance with a preferred embodiment of the invention, comprising two independent and decoupled control loops for IMC control of the process gas in a drying chamber.

In the process 10 according to the present invention x and z of the gas are controlled by means of a control paradigm which is shown in FIG. 4 and which comprises a decoupled system of two separate control loops which is obtained by the two control loops comprising:

gas output flow—gas content of substance taken up from the product; and gas supply flow—pressure conditions in the drying chamber; respectively.

Both the above loops are based on IMC technology, i.e. they comprise, apart from the necessary sensors 41, 51, controllers 43, 53, 44, 54 and actuators 46, 56, at least one process model 42, 52 which describes the dynamics of the gas containing the substance taken up from the product in the drying chamber, and especially the influence of the input and output flow of the process gas on the gas content of the substance taken up from the product and/or on the pressure conditions inside the drying chamber, a loop specific transfer function, a loop specific filter 45, 55. The loop are coordinated in an decoupled system, with a feed forward compensating unit 15 in which the variable a which represents supply flow, is compensated for a change in output flow e. Thus, the two process variables which are essential for the process, can be controlled essentially independent of each other, which results in a process 10 with a simple, reliable process control which is highly robust and has low sensitivity to disturbances, which allows the desired objects concerning quality and process economics may be reached. The block diagram shown in FIG. 4 of a process control system used in an embodiment of the present invention. The system comprises a control paradigm with two decoupled control loops, a first for gas output flow—gas content of substance taken up from the product, and a second for gas supply flow—pressure conditions inside the drying chamber output air—water content. The first control loop is arranged to control the process gas content of the substance taken up from the product, and comprises, apart from the process 10 and the feed forward compensating unit 15 which co-ordinates the loops in an decoupled system:

a sensor or other transducer member 51 for determining the content or amount of substance taken up from the product in the process gas, and determining an actual value of the process variable x;

an actuator 56 for the output flow, e, such as a damper or a speed controlled fan;

a first controller 53 with a first input connected to the sensor 51 and a second input connected to a model $G_{za0}$ of the controlled drying process, preferably relating to the relationships between the process gas content of the substance taken up from the product, output flow and their relationships with other process variables, and an output connected to a second controller 54 serially connected to arranged to said first controller 53;

a second controller 54 with a first input connected to the output of the first controller and a second input for receiving an external point of operation, x-ref. and an output connected to the process 10 and the process model 52 via a loop specific filter 55 with a correcting function $F_1$, in which the control signal from the output of the second controller 54 is corrected for the influence of the control system before being delivered to the actuator 56 and the process model 52. The second control loop is arranged to control the pressure conditions inside the drying chamber and comprises, apart from the process 10 and the feed forward compensating unit 15, which co-ordinates the loops in a decoupled system;

a sensor 41 or other transducer means for determining an actual value of the pressure conditions, z, inside the chamber, for example in the form of a zero-level value;

an actuator 46 for the process gas supply flow, a, such as a damper or a speed controlled fan;

a first controller 43 having a first input connected to the zero-level measuring means and a second input connected to a model $G_{xe0}$ of the controlled process, preferably relating to the pressure inside the chamber, the process gas supply flow and their relationships with other process variables, and an output connected to a second controller 44 arranged in series with said first controller 43;

a second controller 44 having a first input connected to the output of the first controller 43, and a second input for receiving an external point of operation, z-ref. and an output connected to the process 10 and the process model via a loop specific filter 45 with a correcting function $F_2$;

a loop specific filter 45 with a function $F_2$ in which the control signal from the output of the second controller 44 is corrected for the influence of the control system before it is delivered to the actuator 46 and the process model 42.

The process models $G_{za0}$ and $G_{xe0}$ are linear with double pole, and gain. They have no zeroes, and no time delays. The loop specific filters 45, 55 are chosen and designed so, that the closed loops essentially present the same kind of dynamics as the corresponding open control loop, but with a time constant which is different from the time constant for the corresponding process controlled by means of an open, conventional control loop. In order to facilitate the start-up of a process according to the present invention, i.e. to make tuning calibration as easy and fast as possible, preferably a number of dimensioning parameters used in the model are pre-determined. In the process model as described above and shown in FIG. 1 is correct, only two parameters need be determined for each specific drying process and dryer hood, namely the time constant T and the gain K. In order to facilitate the tuning, the dimensioning parameters which are comprised in the functions $F_1$ and $F_2$ of the loop specific filter 45, 55 are given default values, derived form the process model. It is known that the transfer function from desired value to output signal, i.e. the closed loop transfer function in the ideal case ($G_0$=G) is $$G_c = GF$$

and that the transfer function from disturbance to output signal in the same case, the sensitivity function is $$S = 1 - G_0 F.$$

If the desired transfer function of the closed loop is $$G_d(s) = \frac{1}{\left(1 + \frac{sT_d}{2}\right)^2}$$

and the transfer function of the corresponding open loop is $$G(s) = \frac{K}{\left(1 + \frac{sT}{2}\right)^2}$$

then one chooses $$F(s) = \frac{1}{K} \frac{\left(1 + \frac{sT}{2}\right)^2}{\left(1 + \frac{sT_d}{2}\right)^2}$$

From this, it follows that only one tuning parameter remains, namely the closed loop time constant $T_d$, which varies between installations, but which, for the purpose of facilitating the commissioning of a drying process, is expressed as a multiple of the time constant T of the open loop;

$$T_d = \tau T$$

The multiple, or factor $\tau$ is easily interpreted; if $\tau<1$, then the closed loop system is faster than the system with the open loop, and if $\tau>1$, then the closed loop system is slower than the open loop system. A high $\tau$ value gives a more robust system. Of course, default values for $\tau$ may be used.

The function of the compensating decoupling in the form of a feed forward filter 15 is set to $$F_f(s) = \frac{-G_{ze}(s)}{G_{za}(s)}$$

and as long as nothing else is known, it may be assumed that an opposite sign is the only difference between the transfer fictions $G_{ze}$ and $G_{za}$ and thus the compensating filter forming the decoupling 15 may be set to $F_f(s)=1$.

The process according to the present invention is fast to tune, but should the need arise, a more precise method may be used, which is of course more time consuming. For tuning under uncomplicated drying conditions, the values for time constants and gain factors in the system are determined, i.e. in total four dimensioning parameters which describe the dynamics of the control loops. Gain factor and time constant can, as was described above, be estimated by means of a bum test. A bump test comprises an big change of the manipulated process variables, which is accomplished by means of a big change in the setting of the actuators arranged for the adjustment of said variables, i.e. the dampers, and an associated recording of the change of the controlled process variables x and z.

For applications with higher demands on the control of the moisture content and moisture profile of the product, such as certain paper qualities or other conditions where the drying process is more sensitive, and requires a more thorough control of the process gas used in the drying chamber, one may also take into consideration parameters such as the multiple, or factor $\tau$ which describes the relationship between a closed control loop used in accordance with the present invention, and the corresponding open control loop;

the transfer functions $G_{ze}$ and $G_{za}$ which, if they vary, influence the compensation of the input gas flow for a change of the output flow e.

With a process according to the invention, which comprises a control paradigm according to the above description with a built-in process model and decoupling of the control loops for the gas content of the substance taken up from the product, for example water, and the pressure conditions inside the drying chamber, for example expressed as the zero-level of the drying chamber, it is possible to achieve, apart from a stable product moisture profile and a good heating economics, the following advantages:

easy tuning, in the standard case only two bump tests are required;

minimised mutual influence between the gas content of the substance taken up from the product, and the pressure conditions inside the drying chamber, which adds stability to the drying process;

flexibility, easy adjustment for non-linearity in the transfer functions or other functions which influence the dynamics of the process or the control system;

high disturbance rejection, the influence from noise and disturbances is minimised;

robustness, in that it allows changes in the process or the paper, without effect on the good function of the process.

Said advantages, and the main object of the present invention are reached by the functions comprised in the process model, the loop specific filters, the compensating feed forward filters used for compensating the input air flow a for a change of the output air flow e, are interconnected in a control system which describes and compensates for the dynamics of the process air and the control system itself.

What is claimed is:

1. Method for controlling process variables of a process gas (10) passing through a drying chamber, and which during the passage through said drying chamber is led adjacent to or through a product so that a substance is taken up by the process gas and the substance at least in part is removed from the product and transported away with the process gas out from the drying chamber, the process variables of the process gas flowing out from the drying chamber being controlled and monitored by monitoring and controlling a first group of process variables comprising content (x) in the process gas of the substance removed from the product and pressure conditions (z) inside the drying chamber are monitored and controlled, and in which one or more process variables forming part of a second group of manipulated process variables, comprising supply flow (a) and output flow (e) of the process gas are manipulated based on a change of one controlled process variable (x; z), wherein the content (x) of the substance removed from the product and the pressure conditions (z) inside the drying chamber are controlled independently of each other, the content (x) of the substance removed from the product being controlled by manipulating the process gas output flow (e), and the pressure conditions (z) being controlled by manipulating the process gas supply flow (a), the supply flow (a) being compensated for a change in the output flow (e).

2. Method according to claim 1 for controlling the process variables of a process gas (10), which is essentially comprised of air, in a drying process in which the dried product contains water, and in which drying process water is removed from the product, taken up by the process air and transported out from the drying chamber with the process air, wherein that the water content (x) of the process air and the pressure conditions (z) inside the drying chamber are controlled independent of each other, the water content (x) being controlled by manipulating the process gas output flow (e), and the pressure conditions (z) being controlled by manipulating the process gas supply flow (a), the supply flow (a) being compensated for a change in the output flow (e).

3. Method according to claim 2 for controlling the process variables of a process gas (10), which is essentially comprised of air passing through a drying chamber arranged adjacent to a product path in which a water containing product, such as paper or mineral based board passes essentially continuously through the drying chamber, and in which, during the passage of the product and the process gas through the drying chamber, these are brought into contact with each other, so that water is taken up by the process air, removed from the product and transported out from the drying chamber with the process air, wherein the water content (x) of the process air and the pressure conditions (z) inside the drying chamber are controlled independent of each other, the water content (x) being controlled by manipulating the process gas output flow (e), and the pressure conditions (z) being controlled by manipulating the process gas supply flow (a), the supply flow (a) being compensated for a change in the output flow (e).

4. Method according to claim 1, wherein the process gas (10) content (x) of the substance removed from the product is controlled by means of a first control loop, said process gas content of substance removed from the product being associated with, and controlled by the manipulated process variable output flow (e) and in that the pressure conditions (z) inside the drying chamber are controlled by means of a second control loop, said drying chamber pressure conditions (z) being associated with, and controlled by the manipulated process variable supply flow (a).

5. Method according to claim 4, including correlating the process gas (10) content (x) of the substance removed from the product to a setting of the manipulated process variable output flow (e), whereby a model $G_{xe0}$ (52) of the process, comprised in the first control loop is used, and correlating the pressure conditions (z) inside the drying chamber to a setting of the manipulated process variable supply flow (a), whereby a model $G_{za0}$ (42) of the process, comprised in the second control loop is used.

6. Method according to claim 4, wherein the first and second control loops are closed, and wherein the value of the manipulated process variable (a; e) of each of the first and second control loops is corrected for the influence of control loop dynamics, by means of a loop specific correcting function ($F_1$, $F_2$)(45, 55) comprised in each of the first and second control loops.

7. Method according to claim 1, wherein the pressure conditions (z) inside the drying chamber are determined, and expressed as the zero-level of the drying chamber.

8. Method according to claim 1, wherein at least one of the manipulated process variables process gas supply flow (a) and output flow (e) are set by means of a damper (56, 46), and are expressed as the relative opening of the damper.

9. Method according to claim 1, wherein at least one of the manipulated process variables process gas supply flow (a) and output flow (e) are set by means of a speed controlled fan (56, 46).

10. Control paradigm for controlling process variables of a process gas (10) which, during the drying of a product flows through a drying chamber, being brought into contact with the product and taking up a substance which is released from the product, and transporting out said substance from the drying chamber, output variables comprising process gas content (x) of the substance taken up from the product and the pressure conditions (z) inside the drying chamber, input variables comprising process gas supply flow (a) and output flow (e), and controllers and actuators for controlling the drying process based on a change of one of the controlled variables, by adjustment of one of the manipulated process variables, wherein the control paradigm comprises two independent, decoupled control loops, a first independent control loop being arranged for controlling the process gas content (x) of the substance evaporated from the product by means of the process gas output flow (e), and a second independent control loop being arranged for controlling the pressure conditions (z) inside the drying chamber by means of the process gas supply flow (a), and that the decoupling of the two control loops is a feed forward decoupling and provided with means for compensating the process gas supply flow (a) for a change in the process gas output flow (e).

11. Control paradigm according to claim 10, wherein both of the control loops are connected to a dynamic model ($G_{xe0}$; $G_{za0}$) (42, 52) of the drying process.

12. Control paradigm according to claim 10, wherein both of the control loops are closed and comprise a correcting function ($F_1$; $F_2$)(45, 55) specific for each loop, for correcting the influence of the control system on the manipulated process variable (a, e) of each loop.

13. Control paradigm according to claim 10, wherein both of the control loops comprise two serially connected controllers (43, 44, 53, 54), a first controller (43, 53) being connected on an input side thereof to an output variable (x; z) and a dynamic process model, and on an output side thereof connected to an input side of a second controller (44, 54) which on an input side thereof is connected to an output of the first controller and an external unit for receiving an external point of operation (x-ref; z-ref.).

14. Device for carrying out a process for drying a product according to claim 1, comprising a drying chamber, actuators for controlling the process variables of a process gas flowing through the drying chamber, comprising an actuator (46) for controlling the supply flow of process gas into the drying chamber, and an actuator (56) for controlling the output flow of process gas from the drying chamber, sensing means (41, 51) and other measuring means for determining the controlled process variables of the process gas, namely the process gas content of a substance removed from the product, and the pressure conditions inside the drying chamber, and controllers, wherein the control system comprises two independent, decoupled control loops, whereby;
 a first control loop is arranged for controlling the process gas content (x) of the substance taken up from the product by means of the process gas output flow (e);

a second control loop being arranged for controlling the pressure conditions (z) inside the drying chamber by means of the process gas supply flow (a); and the loops are independent of each other, and decoupled by means of at least one feed forward filter (15) for compensating the process gas supply flow (a) for a change in the output flow (e).

15. Device according to claim 14, wherein both of said loops are connected to an electronic unit (42, 52) with software in the form of a dynamic model of the drying process.

16. Device according to claim 14, wherein both of said loops are closed and comprise a respective, loop specific filter (45, 55) with a function ($F_1$, $F_2$) for correcting the influence of the control system on the manipulated process (a, e) variable of the respective loop.

17. Device according to claim 14, wherein both of said loops comprise two serially connected controllers (43, 44, 53, 54), a first controller being provided with a first input for the sensing means (41, 51) determining the output variable (x; z), a second input for the dynamic process model (42, 52) and an output connected to an input of a second controller (44, 54), and a second input connected to an external unit for receiving an external point of operation (x-ref.; z-ref.) and an output connected to the process (10) and the dynamic process model (42, 52) via a loop specific correcting filter (45, 55).

18. Device according to claim 14, wherein the control system comprises an electronic unit with the necessary software for:

independently controlling content (x) in the process gas of the substance taken up from the product and pressure conditions (z) inside the drying chamber, by means of process gas (10) output flow (e) and supply flow (a), respectively, by means of sensing means (41, 51), controllers (43, 44, 53, 54) and actuators (46, 56);

for compensating the process gas supply flow (a) for a change in the process gas output flow (e) in the compensating unit (15);

for dynamic process models (52, 42); and for filter functions (45, 55).

* * * * *